This invention relates generally to the control of missiles or other aircraft in flight and more particularly, to a novel free-spinning articulated rotor system adapted to be coupled to a missile or aircraft.

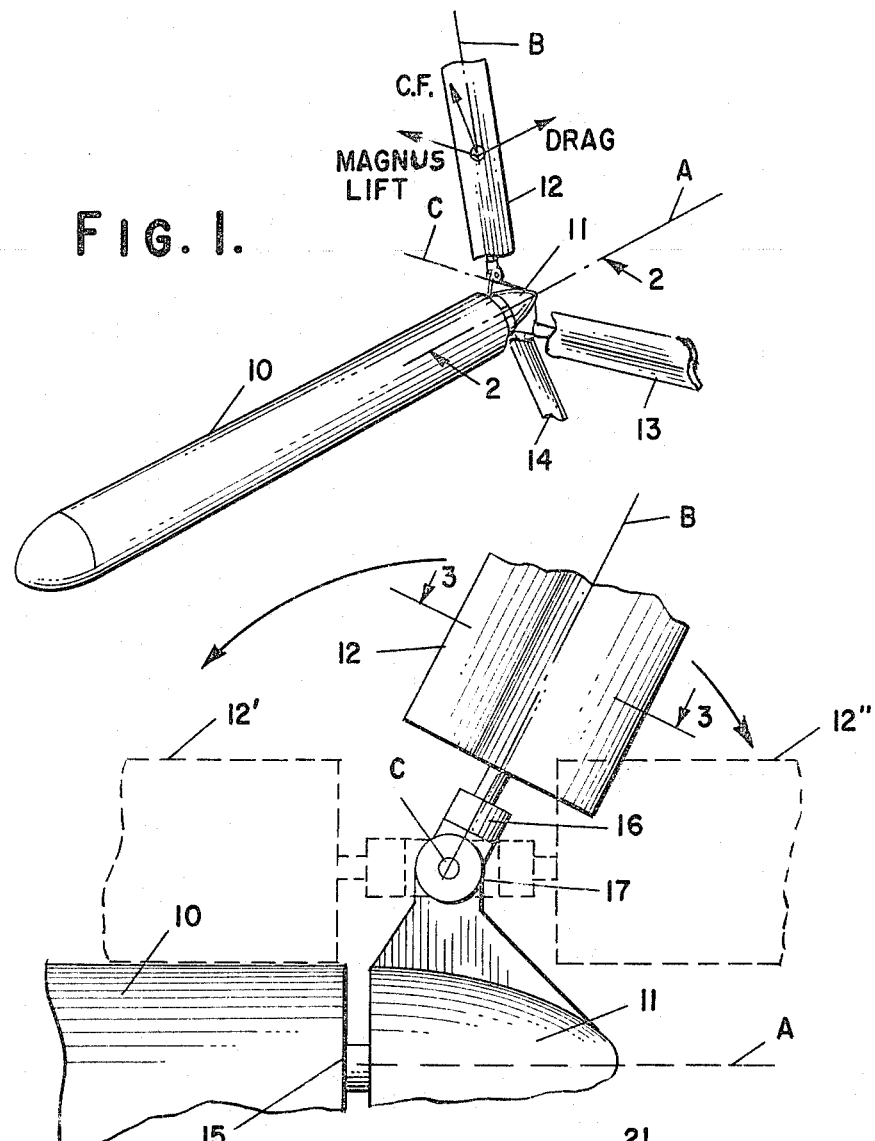
FIG. 1.
FIG. 2.
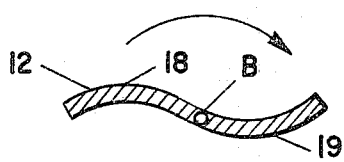
FIG. 3.
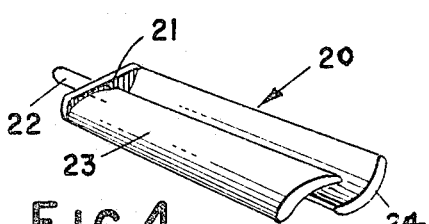
FIG. 4.
INVENTORS
JAMES E. BRUNK
ABRAHAM FLATAU
By Elliott & Pastoriza
ATTORNEYS 3,291,418
FREE SPINNING ARTICULATED ROTOR
James E. Brunk, 1266 Coast Village Road, Santa Barbara, Calif., and Abraham Flatau, P.O. Box 657, Edgewood, Md.
Filed May 28, 1964, Ser. No. 370,889
10 Claims. (Cl. 244—3.23)

For convenience in describing the present invention, the term "missile" is defined herein to encompass any type of body, aircraft, projectile, or the like moving through the atmosphere.

Many devices have been proposed for decelerating missiles during powered flights or free-fall movements through the atmosphere. For example, in landing payloads, it is common practice to employ a parachute. In other instances, stabilizing fins have been proposed which may be deployed in a manner to slow down the missile or otherwise control its motion.

It is a primary object of the present invention to provide a novel missile control device in the form of a free-spinning rotor structure adapted to be secured to a missile body and deployed in flight to exert a desired drag on the missile or to otherwise control the flight path of the missile.

More particularly, it is an object to provide a free-spinning rotor structure for a missile which is completely automatic in operation by employing aerodynamic forces to effect the desired action to the end that active drive means are not necessary.

More generally, an object is to provide a device for decelerating and stabilizing missiles to control their trajectories.

Briefly, these and other objects and advantages of this invention are attained by providing a rotor hub structure adapted to be coupled to the aft end of a missile for rotation about an axis corresponding to the longitudinal axis of the missile. Suitable bearing means in turn are provided together with rotor blade means of novel construction coupled to the bearing means for rotation about their own longitudinal axes. The bearing means in turn are preferably articulated to the rotor hub structure in such a manner that the entire rotor blade means may swing in a plane including the longitudinal axis of the missile. By this arrangement, the rotor blade means may be folded to extend generally in a direction parallel to the missile axis and subsequently deployed to exert a desired drag or stabilizing force.

In respect to the foregoing, the deploying of the rotor blade means may be effected completely automatically in response to areodynamic forces.

A better understanding of the invention will be had by now referring to a preferred embodiment thereof as illustrated in the accompanying drawings, in which:

FIGURE 1 is a perspective view illustrating the free-spinning rotor structure of this invention on the aft end of a missile in deployed condition;

FIGURE 2 is a greatly enlarged fragmentary elevational view of the mounting means for one of the rotor blade means looking generally in the direction of the arrows 2—2 of FIGURE 1;

FIGURE 3 is a cross-section of one of the rotor blade means taken in the direction of the arrows 3—3 of FIGURE 2; and, FIGURE 4 is a perspective view of a modified type of rotor blade construction.

Referring first to FIGURE 1, there is shown a missile 10. Adapted to be coupled to the aft end of the missile 10 is a rotor hub structure 11 to which suitable mounting means are secured for supporting rotor blade means 12, 13 and 14. While three rotor blades have been illustrated circumferentially spaced at approximately 120° to each other, it is possible to incorporate two or even a single rotor blade, or any number of blades greater than three, with due consideration to possible interference between the blades and any other structure on the missile body 10.

As indicated in FIGURE 1, the longitudinal axis A of the missile extends through the central portion of the rotor hub structure 11, the rotor hub structure being rotatably mounted for rotation about this axis. Each of the rotor blades 12, 13 and 14, in turn, is individually mounted for free spinning or rotative movement about its own respective longitudinal axis. Thus, for example, the blade 12 is free to spin about its longitudinal axis B. In addition, the mounting means for the blades also include coupling arrangements in the form of pivots for permitting individual swinging movement of the blades. This swing movement for the blade 12 takes place about an axis C which is normal to the longitudinal axis A of the missile 10. Therefore the swinging movement takes place in a plane including the longitudinal axis of the missile.

Referring particularly to FIGURE 2, further details of the mounting structure will be evident. As shown, there is provided a central shaft 15 co-incident with the longitudinal axis A of the missile body 10 for mounting the rotor hub 11. A bearing means 16, in turn, provides a mounting for the inner end of the rotor blade 12 so that the rotor blade may spin or rotate about its longitudinal axis B. This bearing means 16 in turn is mounted to a pivot structure 17 connected to the rotor hub 11. The pivot structure permits swinging movement of the rotor blade as described about the axis C which is normal to the plane of the paper as viewed in FIGURE 2.

As indicated by the dotted line positions 12' and 12", the rotor blade 12 may swing through an arc of approximately 180°. These dotted line positions extend from the left hand position shown in which the rotor blade axis B is substantially parallel to the missile axis A and the blade extends forwardly, to the right hand position in which the longitudinal axis B is parallel to the missile axis A with the blade 12 extending in an aft direction.

The cross-section of the blades may be of any suitable shape which will result in auto-rotation or spinning of the rotor blades about its axis when subjected to air flow. In FIGURE 3 the cross-section illustrated is generally S-shaped to provide dual curved portions 18 and 19 with oppositely extending radii of curvature on either side of the longitudinal blade axis B. If air flow crosses the blade 12 from left to right, the blade will be caused to rotate in a clockwise direction as indicated by the arrow in FIGURE 3.

FIGURE 4 illustrates another type or rotor blade means 20 comprising a mounting plate 21 secured to a shaft 22 adapted to rotate in a bearing similar to the bearing 16 of FIGURE 2. Mounted to the plate 21 are first and second air foil sections 23 and 24 laterally offset from the longitudinal axis of the shaft 22 and in opposing relationship as shown. By this arrangement, there will be induced auto-rotation when the blade is disposed in an air stream.

In operation, the various rotor blades 12, 13 and 14, of FIGURE 1 may be folded in an aft direction or alternatively, folded in a forward direction to lie against the body of the missile 10 and thus provide a compact structure. When the missile is placed in free flight and is falling towards the ground, the air flow past the rotor blades will initially induce spinning or rotation of each of the blades individually about their respective longitudinal axes. For the blade 12, this spinning would be about axis B. This spinning movement of each of the rotor blades will result in a magnus lift force generally directed at right angles to the blade axes as indicated in FIGURE 1. The magnus force generated by the spinning blade will cause rotation of the hub structure 11 or revolving movement of the blades about the missile axis A. This revolving movement in turn will establish a centrifugal force indicated at C.F. in FIGURE 1 which will tend to deploy the blades or swing them outwardly. As the blades are swung outwardly, a greater effective area is exposed to the air stream with the result that faster spinning movement takes place to increase the magnus forces. The magnus forces directed as shown, will increase the revolving movement of the blades with the rotor structure 11 about the axis A of the missile and thus result in a greater centrifugal force. The process is thus self-generating until the blades are deployed at a given angle. This angle will depend upon the drag forces experienced by the blades which tend to cause them to collapse back towards their original positions.

There will thus be established a balance between the centrifugal force and the drag forces with an overall resulting drag on the missile body 10 so that the same may be decelerated, or controlled as desired.

While only two particular cross-sections have been illustrated for the rotor blade structures, it will be evident to those skilled in the art that other cross-sections may be provided which will result in auto-rotation of the blades about their own longitudinal axes to provide the desired magnus forces.

What is claimed is:

1. A free spinning rotor structure for coupling to a missile comprising: a rotor blade means; bearing means mounting said rotor blade means for free spinning rotation about its own longitudinal axis; and hub means coupling said bearing means and rotor blade means for revolving movement about the longitudinal axis of said missile.

2. A free spinning articulated rotor structure for coupling of a missile comprising, in combination: a hub structure adapted to be mounted to said missile for rotation about the longitudinal axis of said missile; a bearing means; a rotor blade means coupled to said bearing means for free spinning rotation about its longitudinal axis; and a pivot means pivoting said bearing means to said hub structure for swinging movement in a plane including said longitudinal axis.

3. A rotor structure according to claim 2, in which said rotor blade means has a cross-section responsive to air flow therepast to cause rotation of said rotor blade means about its longitudinal axis.

4. A rotor structure according to claim 3, in which said cross-section is S-shaped.

5. A rotor structure according to claim 3, in which said rotor blade means includes two off-set air foils positioned in an opposite sense to define said cross-section.

6. A rotor structure according to claim 3, including at least one additional bearing means and rotor blade means coupled together and to said rotor hub structure in a manner similar to said first mentioned rotor blade means.

7. A free spinning articulated rotor structure for coupling to a missile having a longitudinal axis comprising, in combination: a rotor hub structure; first bearing means for coupling said rotor hub structure to the aft end of said missile for rotation about said longitudinal axis of said missile; at least two bearing means; at least two rotor blade means each having a longitudinal axis and coupled respectively to said two bearing means for free spinning rotation about their respective longitudinal axes; and at least two pivot means coupling said two bearing means to said rotor hub structure for free swinging movement in planes including the longitudinal axis of said missile, each of said rotor blade means having a cross-section to result in auto-rotation thereof about their respective longitudinal axes.

8. A rotor structure, according to claim 7, in which said cross-section is S-shaped.

9. A rotor structure according to claim 7, in which each rotor blade means includes two laterally off-set, opposed air foils.

10. A rotor structure according to claim 7, in which each of said rotor blade means is free to swing through an arc of substantially 180° from positions parallel to the longitudinal axis of said missile and extending in a forward direction to positions parallel to the longitudinal axis of said missile and extending in an aft direction.

References Cited by the Examiner
UNITED STATES PATENTS

| | | | |
|---|---|---|---|
| 1,964,016 | 6/1934 | Wiley | 102—35.4 |
| 2,545,736 | 3/1951 | Isacco | 244—138.1 |
| 3,098,445 | 7/1963 | Jackson | 102—34.1 X |
| 3,101,121 | 8/1963 | MacNeal | 244—138.1 X |

BENJAMIN A. BORCHELT, *Primary Examiner.*

V. R. PENDEGRASS, *Assistant Examiner.*